(12) United States Patent
Kim et al.

(10) Patent No.: US 9,213,883 B2
(45) Date of Patent: Dec. 15, 2015

(54) METHOD AND APPARATUS FOR PROCESSING DEPTH IMAGE

(71) Applicant: SAMSUNG ELECTRONICS CO., LTD., Suwon-si (KR)

(72) Inventors: Sunkwon Kim, Yongin-si (KR); Ouk Choi, Yongin-si (KR); Seungkyu Lee, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 177 days.

(21) Appl. No.: 13/737,332

(22) Filed: Jan. 9, 2013

(65) Prior Publication Data

US 2013/0177236 A1 Jul. 11, 2013

Related U.S. Application Data

(60) Provisional application No. 61/584,930, filed on Jan. 10, 2012.

(30) Foreign Application Priority Data

Aug. 27, 2012 (KR) ......................... 10-2012-0093529

(51) Int. Cl.
*G06K 9/00* (2006.01)
*G01S 17/89* (2006.01)
*G01S 7/487* (2006.01)
*G06T 5/00* (2006.01)

(52) U.S. Cl.
CPC ............. *G06K 9/00201* (2013.01); *G01S 7/487* (2013.01); *G01S 17/89* (2013.01); *G06T 5/003* (2013.01); *G06T 2207/10028* (2013.01)

(58) Field of Classification Search
None
See application file for complete search history.

(56) References Cited

U.S. PATENT DOCUMENTS

| | | | |
|---|---|---|---|
| 2004/0237103 A1* | 11/2004 | Kondo et al. .................... | 725/37 |
| 2007/0228278 A1* | 10/2007 | Paximadis et al. ............ | 250/330 |
| 2008/0283729 A1* | 11/2008 | Hosaka ....................... | 250/208.1 |
| 2010/0149350 A1* | 6/2010 | Fukumoto et al. ......... | 348/208.4 |
| 2010/0231800 A1 | 9/2010 | White et al. | |
| 2010/0309201 A1* | 12/2010 | Lim et al. ..................... | 345/419 |
| 2011/0090378 A1 | 4/2011 | Wang et al. | |
| 2011/0102642 A1 | 5/2011 | Wang et al. | |
| 2011/0273529 A1* | 11/2011 | Lai et al. ......................... | 348/42 |
| 2013/0286017 A1* | 10/2013 | Marimon Sanjuan et al. ............................ | 345/427 |

FOREIGN PATENT DOCUMENTS

| | | | | |
|---|---|---|---|---|
| KR | 10-2008-0034508 | | 4/2008 | |
| WO | WO 2011/138472 | * | 11/2011 | .............. G06T 13/00 |

OTHER PUBLICATIONS

"Definition of regularity" [online]. Merriam-Webster Dictionary, 2014 [retrieved Nov. 5, 2014]. Retrieved from the Internet: < URL: http://www.merriam-webster.com/dictionary/regularity >, p. 1.*

* cited by examiner

*Primary Examiner* — Bhavesh Mehta
*Assistant Examiner* — David F Dunphy
(74) *Attorney, Agent, or Firm* — Harness, Dickey & Pierce, P.L.C.

(57) ABSTRACT

An apparatus and method for processing a depth image. A depth image may be generated with reduced noise and motion blur, using depth images generated during different integration times that are generated based on the noise and motion blur of the depth image.

16 Claims, 10 Drawing Sheets

METHOD AND APPARATUS FOR PROCESSING DEPTH IMAGE

CROSS-REFERENCE TO RELATED APPLICATIONS

This application claims the priority benefit under 35 U.S.C. §119(e) of U.S. Provisional Application No. 61/584,930, filed on Jan. 10, 2012, in the U.S. Patent and Trademark Office, and under 35 U.S.C. §119(a) of Korean Patent Application No. 10-2012-0093529, filed on Aug. 27, 2012, in the Korean Intellectual Property Office, the entire disclosures of each of which are hereby incorporated by reference.

BACKGROUND

1. Field

Example embodiments of the following disclosure relate to a method and apparatus for processing a depth image, and more particularly, to a method and apparatus for processing a depth image based on an integration time used to generate the depth image.

2. Description of the Related Art

A Time-of-Flight (ToF) depth camera provides two-and-a-half-dimensional (2.5D) information of a scene. With respect to 2.5D, a method may provide depth information for a visible surface.

The ToF depth camera may include a light emitting diode (LED), which radiates an infrared (IR) signal, and a sensor, which detects the IR signal. The IR signal transmitted from the LED bounces off an object and returns to the sensor that detects the IR signal. For example, the IR signal may correspond to an IR light.

A travel time of the IR signal may be calculated from a phase difference between the IR signal transmitted from the ToF depth camera and the IR signal detected by the ToF depth camera. The ToF depth camera may generate a ToF depth image by generating an image based on a distance converted from the calculated travel time of the IR signal. That is, the ToF depth image may represent the distance between the camera and the object in view of the camera, the distance being converted from the travel time of the IR signal.

The phase difference between the IR signals may be calculated indirectly by measuring an intensity of the IR signal detected by the sensor based on two or four phases. For example, the intensity of the IR signal may correspond to an intensity of an IR light.

Further, an integration time may refer to a sum of the time to measure the intensity of the IR signal based on each phase. When the object or the ToF depth camera is moved during the integration time, a motion blur may occur in a generated ToF depth image taken with the ToF depth camera.

Therefore, there is a need for improved depth image processing.

SUMMARY

The foregoing and/or other aspects are achieved by providing a method of processing a depth image, the method including determining at least one spatio-temporal neighboring pixel of a pixel of an input depth image, calculating a weight value of the at least one spatio-temporal neighboring pixel, and generating an output depth image by updating a depth value of the pixel of the input depth image based on a depth value and the weight value of the at least one spatio-temporal neighboring pixel.

The input depth image may correspond to an intermediate input depth image.

The determining may include identifying a first correspondence between a previous input depth image and a next input depth image, detecting a motion vector based on the identified first correspondence, estimating a second correspondence between one of the previous and next input depth images and the intermediate input depth image based on the detected motion vector, and determining at least one spatio-temporal neighboring pixel of a pixel of the intermediate input depth image based on the estimated second correspondence.

The previous input depth image may correspond to an input depth image preceding the intermediate input depth image chronologically. The next input depth image may correspond to an input depth image following the intermediate input depth image chronologically.

An integration time of the previous input depth image and an integration time of the next input depth image may be shorter than an integration time of the intermediate input depth image.

The identifying may include calculating an optical flow between a previous infrared (IR) intensity image and a next IR intensity image, and identifying the first correspondence based on the optical flow.

The previous IR intensity image may correspond to the previous input depth image.

The next IR intensity image may correspond to the next input depth image.

The identifying may further include reducing an amount of noise in the previous IR intensity image and the next previous IR intensity image by applying a bilateral filter to the previous IR intensity image and the next previous IR intensity image.

The weight value of the at least one neighboring pixel may increase as the amount of noise decreases in the at least one neighboring pixel.

The weight value of the at least one neighboring pixel may increase as motion blur occurring in the at least one neighboring pixel decreases.

The foregoing and/or other aspects are also achieved by providing a method of processing a depth image, the method including calculating a noise level of a depth image, calculating a motion blur level of the depth image, and determining an integration time used to generate the depth image based on at least one of the noise level and the motion blur level.

The determining may include increasing the integration time when the noise level of the depth image is greater than a noise level of a previous depth image, and decreasing the integration time when the motion blur level of the depth image is greater than a motion blur level of the previous depth image.

The foregoing and/or other aspects are also achieved by providing an apparatus for processing a depth image, the apparatus including a receiving unit configured to receive an input depth image, and a processing unit configured to determine at least one spatio-temporal neighboring pixel of a pixel of the input depth image, to calculate a weight value of the at least one spatio-temporal neighboring pixel, and to generate an output depth image by updating a depth value of the pixel of the input depth image based on a depth value and the weight value of the at least one spatio-temporal neighboring pixel.

The processing unit may be configured to identify a first correspondence between a previous input depth image and a next input depth image, to detect a motion vector based on the identified first correspondence, to estimate a second correspondence between one of the previous and next input depth images and the intermediate input depth image based on the detected motion vector, and to determine at least one spatio-temporal neighboring pixel of a pixel of the intermediate input depth image based on the estimated second correspondence.

The processing unit may be configured to calculate an optical flow between a previous IR intensity image and a next IR intensity image, and to identify the first correspondence based on the optical flow.

The processing unit may be configured to reduce an amount of noise in the previous IR intensity image and the next previous IR intensity image by applying a bilateral filter to the previous IR intensity image and the next previous IR intensity image.

The processing unit may be configured to increase the weight value of the at least one neighboring pixel as the amount of noise decreases in the at least one neighboring pixel.

The processing unit may be configured to increase the weight value of the at least one neighboring pixel as motion blur occurring in the at least one neighboring pixel decreases.

The foregoing and/or other aspects are also achieved by providing an apparatus for processing a depth image, the apparatus including a receiving unit configured to receive a depth image, and a processing unit configured to calculate a noise level and a motion blur level of the depth image, and to determine an integration time used to generate the depth image based on the at least one of the noise level and the motion blur level.

The processing unit may be configured to increase the integration time when the noise level of the depth image is greater than a noise level of a previous depth image, and to decrease the integration time when the motion blur level of the depth image is greater than a motion blur level of the previous depth image.

The foregoing and/or other aspects are also achieved by providing a method of processing an image, the method including: determining at least one of a noise level and a motion blur level for each of a previous depth image and an input depth image; and increasing an integration time of the input depth image when the noise level of the input depth image is greater than the noise level of the previous depth image, and decreasing the integration time of the input depth image when the motion blur level of the input depth image is greater than the motion blur level of the previous depth image.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
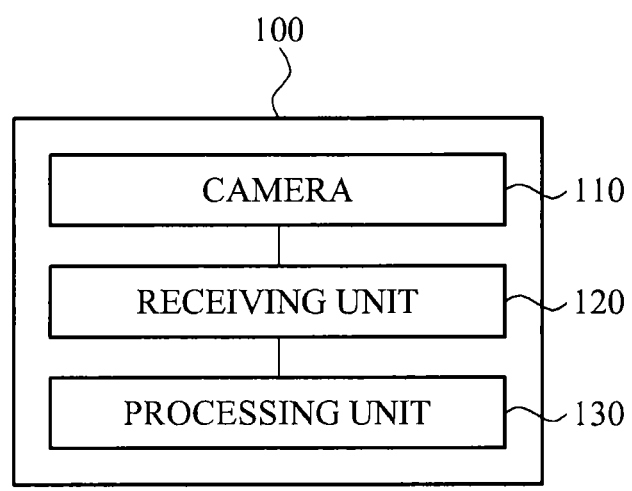
FIG. 1 illustrates an apparatus for processing a depth image, according to an example embodiment.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates an apparatus 100 for processing a depth image, according to an example embodiment.

Referring to FIG. 1, the apparatus 100 for processing a depth image may include a camera 110, a receiving unit 120, and a processing unit 130. Each of the units described above may include at least one processing device.

The camera 110 may correspond to a depth camera. For example, the camera 110 may correspond to a Time-of-Flight (ToF) depth camera. The camera 110 may generate an input depth image by photographing a scene. The camera 110 may generate a series of input depth images over time.

The receiving unit 120 may receive the input depth image from the camera 110.

The processing unit 130 may generate an output depth image based on the input depth image.

Figure 2:
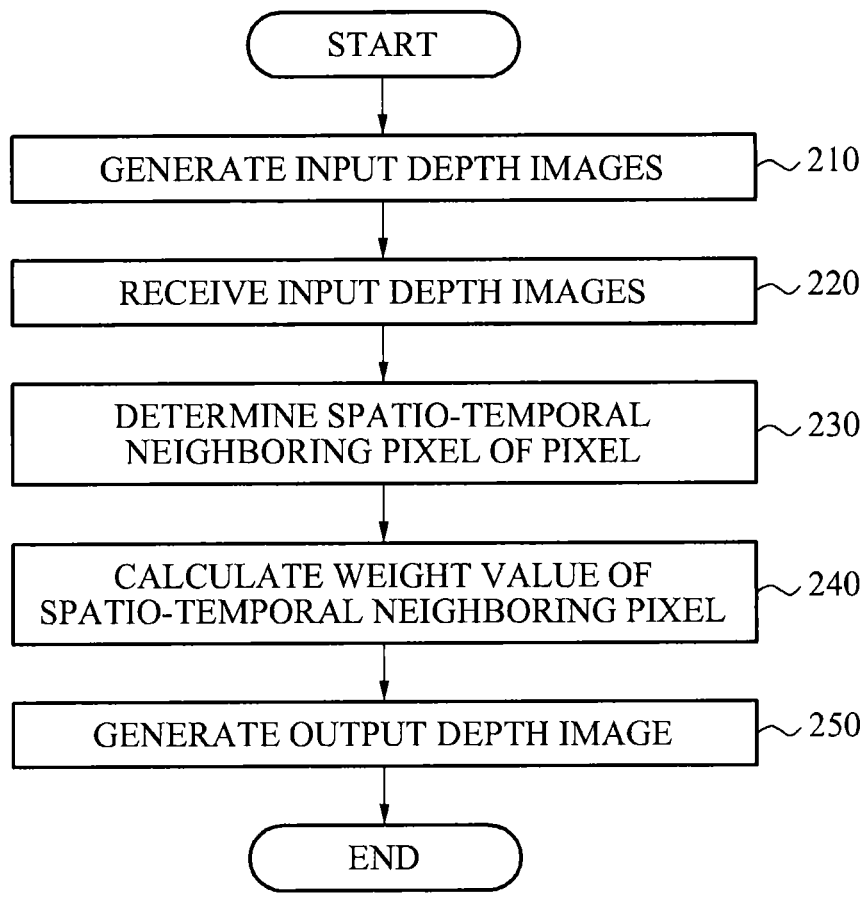
FIG. 2 is a flowchart illustrating a method of processing a depth image, according to an example embodiment.

FIG. 2 is a flowchart illustrating a method of processing a depth image, according to an example embodiment.

Referring to FIG. 2, in operation 210, the camera 110 may generate a plurality of input depth images by photographing a scene. The camera 110 may generate a plurality of input depth images by photographing a scene in succession.

The plurality of input depth images may differ in terms of integration time. For example, the camera 110 may take each of the plurality of input depth images during different integration times.

An input depth image taken during a relatively shorter integration time may have more noise and less motion blur than an input depth image taken during a relatively longer integration time. That is, characteristics of an input depth image may differ depending on an integration time used to generate the input depth image. The integration time used to generate the input depth image may be referred to as an integration time of the input depth image. The motion blur may occur due to a relative movement between the camera 110 and an object being photographed with the camera 110.

In operation 220, the receiving unit 120 may receive the plurality of input depth images from the camera 110.

In operation 230, the processing unit 130 may determine at least one spatio-temporal neighboring pixel for each pixel of the input depth image. For example, the input depth image may be one input depth image corresponding to an output depth image among the plurality of input depth images, and the input depth image may correspond to an intermediate input depth image.

The plurality of input depth images may include a previous input depth image, an intermediate input depth image, and a next input depth image. The intermediate input depth image may correspond to an input depth image corresponding to an output depth image to be generated by the processing unit 130. The previous input depth image may correspond to at least one input depth image preceding the intermediate input depth image chronologically, among the plurality of input depth images. The next input depth image may correspond to at least one input depth image following the intermediate input depth image chronologically, among the plurality of input depth images.

Further, as an example, the previous input depth image and the next input depth image may correspond to input depth images taken during a short integration time. The intermediate input depth image may correspond to an input depth image taken during a long integration time. That is, the integration time of the previous input depth image and the integration time of the next input depth image may be shorter than the integration time of the intermediate input depth image. The integration time of the previous input depth image and the integration time of the next input depth image may be equal. Due to a difference in integration times, the previous input depth image and the next input depth image may have more noise and less motion blur than the intermediate input depth image. However, the present disclosure is not limited to the above described example.

For example, when the output depth image generated by the processing unit 130 corresponds to an input depth image at a time 't', the intermediate input depth image may correspond to an input depth image at a time 't'. The previous input depth image may correspond to an input depth image at a time 't−1'. The next input depth image may correspond to an input depth image at a time 't+1'. The previous input depth image and the next input depth image may be a plurality of input depth images.

Among pixels of the intermediate input depth image, a pixel to be processed may be referred to as a target pixel. Spatio-temporal neighboring pixels of the target pixel may refer to pixels neighboring the target pixel in the intermediate input depth image. The temporal neighboring pixels of the target pixel may refer to pixels corresponding to the target pixel in the previous input depth image or the next input depth image. The spatio-temporal neighboring pixels of the target pixel may refer to pixels neighboring the target pixel spatially and/or chronologically, i.e., temporally.

In operation 240, the processing unit 130 may calculate a weight value for each of the at least one spatio-temporal neighboring pixel for each pixel of the intermediate input depth image. The calculating of the weight value is described later, for example, with reference to at least FIG. 9.

In operation 250, the processing unit 130 may generate an output depth image corresponding to the intermediate input depth image based on a depth value and a weight value for each of at least one spatio-temporal neighboring pixel. The processing unit 130 may generate the output depth image by updating a depth value for each pixel of the input depth image based on the depth value and the weight value for each of the at least one spatio-temporal neighboring pixel.

Figure 3:
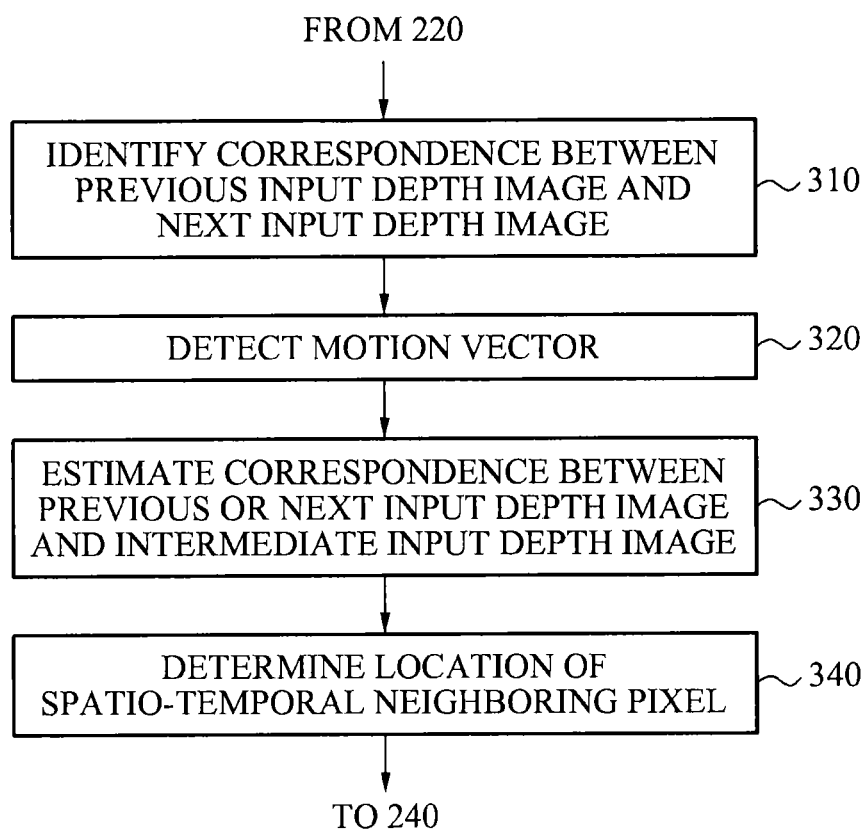
FIG. 3 is a flowchart illustrating a method of determining a spatio-temporal neighboring pixel, according to an example embodiment.

FIG. 3 is a flowchart illustrating a method of determining a spatio-temporal neighboring pixel according to an example embodiment.

Operation 230 of FIG. 2 may include operations 310, 320, 330, and 340.

The processing unit 130 may determine at least one spatio-temporal neighboring pixel for each pixel of the intermediate input depth image based on motion estimation. The motion estimation may correspond to a process of identifying a correspondence between two depth images. The correspondence between two depth images may refer to a correspondence between pixels of the two depth images. That is, the correspondence may include information about matching between a pixel of a first depth image and a pixel of a second depth image.

For example, the two input depth images may include a previous input depth image and a next input depth image. As another example, the two input depth images may include a previous input depth image and an intermediate input depth image. The two input depth images may include an intermediate input depth image and a next input depth image. Hereinafter, for clarity, a method of determining at least one spatio-temporal neighboring pixel for each pixel of the intermediate input depth image based on motion estimation between the previous input depth image and the next input depth image is described.

In operation 310, the processing unit 130 may identify a correspondence between the previous input depth image and the next input depth image. For example, the correspondence between the previous input depth image and the next input depth image may be referred to as a first correspondence.

In operation 320, the processing unit 130 may detect a motion vector based on the identified first correspondence. For example, the motion vector may correspond to a vector representing a motion from a first pixel of the previous input depth image to a second pixel of the next input depth image corresponding to the first pixel.

In operation 330, the processing unit 130 may estimate a correspondence between one of the previous and next input depth images and the intermediate input depth image, based on the detected motion vector. Here, the correspondence between one of the previous and next input depth image and the intermediate input depth image may be referred to as a second correspondence.

For example, the processing unit 130 may estimate the correspondence between the previous input depth image and the intermediate input depth image or the correspondence between the intermediate input depth image and the next input depth image, by reducing a size of the motion vector detected in operation 320 by a factor of one half, however, the present disclosure is not limited thereto.

The processing unit 130 may determine a location for each of at least one spatio-temporal neighboring pixel of a pixel in the intermediate input depth image based on the estimated correspondence.

In operation 340, the processing unit 130 may determine at least one spatio-temporal neighboring pixel for each pixel of the intermediate input depth image based on the estimated correspondence.

Figure 4:
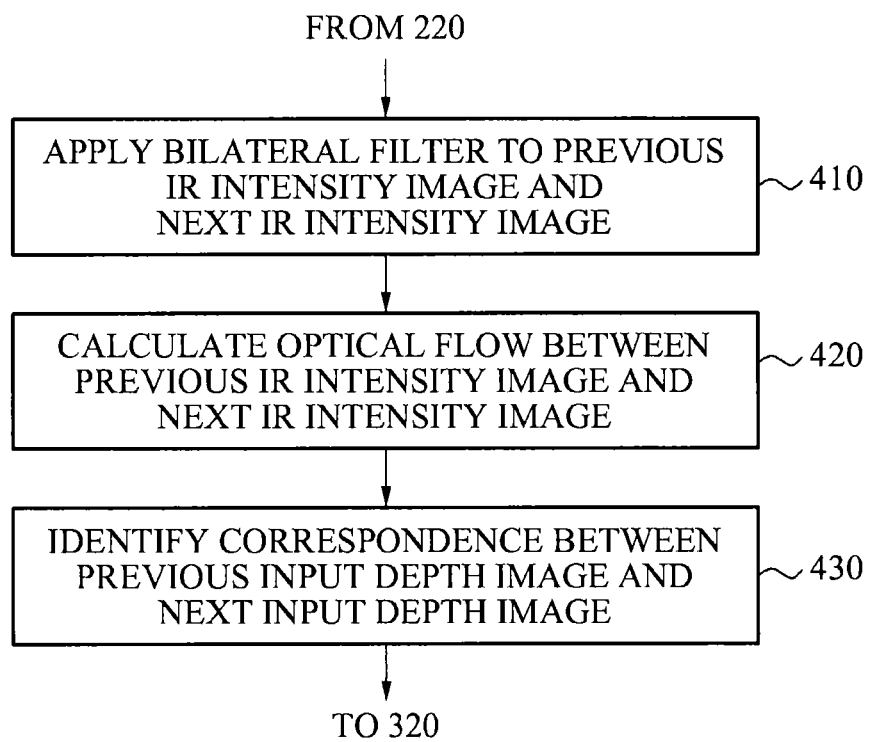
FIG. 4 is a flowchart illustrating a method of estimating a correspondence between input depth images based on an infrared (IR) intensity image, according to an example embodiment.

FIG. 4 is a flowchart illustrating a method of estimating a correspondence between input depth images based on an infrared (IR) intensity image, according to an example embodiment.

Operation 310 of FIG. 3 may include at least operations 410, 420, and 430.

The processing unit 130 may estimate the first correspondence based on IR intensity images.

The IR intensity image may be generated by accumulating IR light reflected from an object, irrespective of phase. The IR intensity image may correspond to one of the plurality of input depth images. For example, the IR intensity image corresponding to the input depth image may be interpreted as the IR intensity image being taken at the same time as the input depth image.

The IR intensity image may be taken concurrently with the input depth image corresponding to the IR intensity image by the camera 110 or a sensor included in the apparatus 100 for processing a depth image. The IR intensity image and the input depth image corresponding to the IR intensity image may have the same viewpoint and/or the same resolution.

A previous IR intensity image may correspond to the previous input depth image. A next IR intensity image may correspond to the next input depth image. Information about one pixel may be included in an input depth image and an IR intensity image. For example, information about a depth value of a pixel at predetermined coordinates may be included in an input depth image, and information about an IR intensity may be included in an IR intensity image. Also, a pixel in an input depth image and a pixel in an IR intensity image having the same location may be regarded as the same pixel.

In operation 410, for example, the processing unit 130 may reduce an amount of noise in each of the previous IR intensity image and the next previous IR intensity image by applying a bilateral filter to each of the previous IR intensity image and the next previous IR intensity image.

In operation 420, the processing unit 130 may calculate an optical flow between the previous IR intensity image and the next IR intensity image. The application of the bilateral filter in operation 410 may result in a more accurate estimation of the optical flow.

In operation 430, the processing unit 130 may identify the first correspondence between the previous input depth image and the next input depth image based on the estimated optical flow. Using the estimated optical flow, information about a motion from a pixel of one depth image to a pixel of another depth image may be represented in a form of a vector. Accordingly, a correspondence between two input images may be estimated using motion information between pixels.

Figure 5:
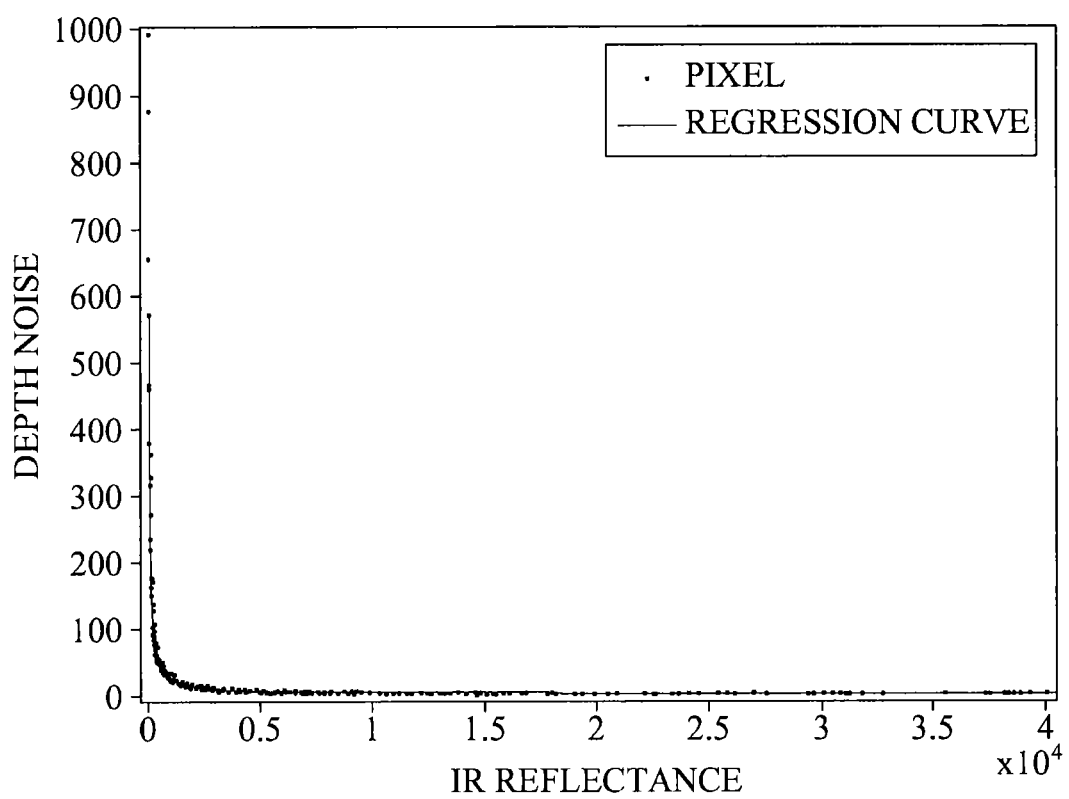
FIG. 5 is a graph illustrating a method of determining a noise level for each pixel of an input depth image based on an IR intensity image, according to an example embodiment.

FIG. 5 is a flowchart illustrating a method of determining a noise level for each pixel of an input depth image based on an IR intensity image, according to an example embodiment.

The weight value calculated in operation 240 of FIG. 2 may be determined based on a noise level for each of at least one neighboring pixel. The processing unit 130 of FIG. 1 may estimate a noise level of a pixel from an IR intensity image. The processing unit 130 may estimate the noise level of the pixel based on changes of depth values of pixels in a spatio-temporal block. For example, the noise level may correspond to a value representing an amount of noise.

The graph of FIG. 5 illustrates a correlation between IR reflectance and depth noise. In the graph of FIG. 5, IR reflectance lies on an x-axis and depth noise lies on a y-axis. A location on the x-axis may indicate a brightness value of a digital image measured with a sensor of the camera 110 of FIG. 1. For example, the y-axis may be expressed in units of millimeters (mm).

The IR reflectance may refer to an intensity of a pixel in an IR intensity image. The depth noise may refer to a noise level of a pixel in an input depth image corresponding to the pixel. The input depth image may correspond to at least one input depth image among the intermediate input depth image, the previous input depth image, and the next input depth image.

In the graph of FIG. 5, a point may represent a pixel. That is, a point on the graph may represent actually measured data of a pixel. The pixel may include a pixel in an IR intensity image and/or a pixel in an input depth image corresponding to the pixel. An x-coordinate of the pixel may indicate IR reflectance of the pixel, and a y-coordinate of the pixel may indicate depth noise of the pixel.

In the graph of FIG. 5, a line may represent a correlation between IR reflectance and depth noise based on distribution of pixels. The correlation may be a regression curve obtained based on measured data.

An amount of noise in a pixel of an input depth image may be determined by a number of electrons generated by a sensor from a reflected IR light. As the number of electrons increases, the amount of noise in the pixel may decrease. As the number of electrons decreases, the amount of noise in the pixel may increase. For example, the electrons generated by the sensor from the reflected IR light may correspond to a number of electrons being generated in the pixel by the sensor sensing the reflected IR light. Generally, a correlation between the amount of noise and the number of electrons may be modeled as a Poisson distribution.

When Poisson distribution modeling is applied to the correlation between the amount of noise and the number of electrons, the processing unit 130 may calculate the noise level in the pixel of the input depth image based on Equation 1.

$$E_{N1} = \frac{k}{\sqrt{N_{electron}}} \quad [\text{Equation 1}]$$

where $E_{N1}$ denotes a value of energy which results from noise in a pixel of an input depth image, and k denotes a constant. $N_{electron}$ may denote a number of electrons generated in the pixel. As shown in Equation 1, the noise level may differ for each pixel of the input depth image.

The noise level in the pixel may change on a time-dependent basis. The noise level in a series of corresponding pixels in a plurality of input depth images may change on a time-dependent basis. As such, depending on embodiments, the processing unit 130 may calculate the noise level of the pixel by measuring changes in depth values of pixels in a spatio-temporal block. For example, the spatio-temporal block may correspond to a window of the input depth image.

The processing unit 130 may calculate the noise level in the pixel of the input depth image based on Equation 2.

$$E_{N2} = \frac{\sum_{i \in Height, j \in Width}(|D(k+1, i, j) - D(k, i, j)| + |D(k, i, j) - D(k-1, i, j)|)}{(\text{Height} \cdot \text{Width})} \quad [\text{Equation 2}]$$

where $E_{N2}$ denotes a value of energy of noise in a pixel of an input depth image.

D may denote a depth value of the pixel. D(a, b, c) may denote a depth value of a pixel at a row 'b' and a column 'c' in an input depth image having an index 'a'. For example, the index may denote a time at which the input depth image is generated. The input depth image having the index 'a' may correspond to an input depth image generated at a time 'a'.

Height and Width may denote a height and a width of a spatio-temporal block, respectively. 'i' and 'j' may denote a vertical location and a horizontal location of one pixel among pixels in the spatio-temporal block.

'k' may denote an index of an intermediate input depth image. 'k−1' may denote an index of a previous input depth image. 'k+1' may denote an index of a next input depth image.

Integration times of the intermediate input depth image, the previous input depth image, and the next input depth image may be equal.

Figure 6:
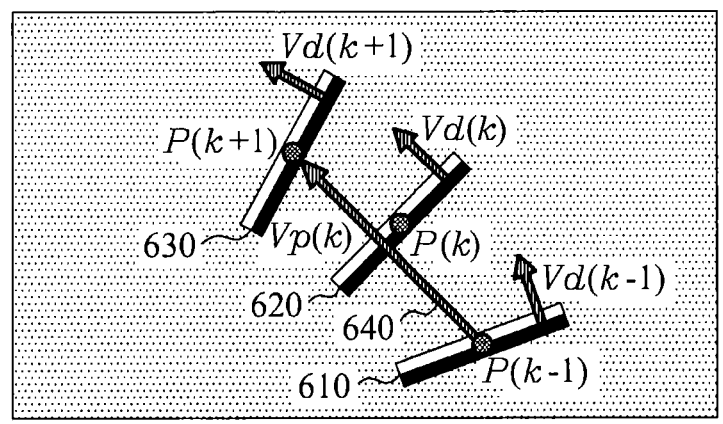
FIG. 6 illustrates a method of determining a motion blur level of a pixel in an input depth image based on analysis of a spatio-temporal pattern, according to an example embodiment.

FIG. 6 illustrates a method of determining a motion blur level in an input depth image based on analysis of a spatio-temporal pattern, according to an example embodiment.

As shown in FIG. 6, a unique pattern may appear at a location in which motion blur occurs in an input depth image.

In FIG. 6, a first pattern 610 generated in an input depth image at a time 'k−1', a second pattern 620 generated in an input depth image at a time 'k', and a third pattern 630 generated in an input depth image at a time 'k+1' are shown. For example, the first pattern 610, the second pattern 620, and the third pattern 630 may each correspond to a pattern estimated to be a motion blur. The input depth image at the time 'k−1', the input depth image at the time 'k', and the input depth image at the time 'k+1' may correspond to a previous input depth image, an intermediate input depth image, and a next input depth image, respectively.

P(k−1), P(k), and P(k+1) may each denote a vector indicating a moving path of the pattern estimated to be motion blur. Vd(k−1), Vd(k), and Vd(k+1) may denote a direction of the first pattern 610, the second pattern 620, and the third pattern 630, respectively. In addition, a vector 640 indicating a motion from the first pattern 610 to the third pattern 630 is shown.

Patterns generated in a plurality of input depth images may have directionality. The processing unit 130 may determine whether the patterns estimated to be motion blur in the plurality of input depth images generated over time correspond to motion blur patterns in actuality, by verifying whether a moving direction of the patterns estimated to be motion blur matches a moving direction of a motion blur pattern.

As an example, the pattern estimated to be motion blur may have a white area and a black area adjacent to the white area. Generally, the white area may be located at a front area of the pattern of motion blur and the black area may be located at a rear area. Accordingly, when front areas of the patterns estimated to be motion blur are white and rear areas are black in the moving direction over time, the processing unit 130 may determine that the patterns estimated to be motion blur represent an actual motion blur.

The processing unit 130 may calculate a value of energy of a motion blur based on Equation 3, shown below. When the value of energy of motion blur is less than a reference value, the processing unit 130 may determine that patterns estimated to be motion blur actually correspond to motion blur patterns.

$$E_{MB} = Vp(k) \cdot Vd(k)$$
$$Vp(k) = \frac{(P(k+1) - P(k)) + (P(k) - P(k-1))}{2} = \frac{P(k+1) - P(k-1)}{2}$$
[Equation 3]

where $E_{MB}$ may denote a value of energy of motion blur. As a difference between angles Vp(k) and Vd(k) increases, $E_{MB}$ may have a greater value. That is, as the difference between the angles Vp(k) and Vd(k) decreases, a probability that patterns estimated to be a motion blur corresponding to motion blur patterns may increase.

When patterns estimated to be a motion blur are determined to be motion blur patterns, the processing unit 130 may calculate a motion blur level of the input depth image by measuring a width and an angle of the motion blur patterns. For example, the motion blur level of the input depth image may correspond to a motion blur level for each pixel of the input depth image. The motion blur level may refer to a value representing an extent of motion blur.

Figure 7:
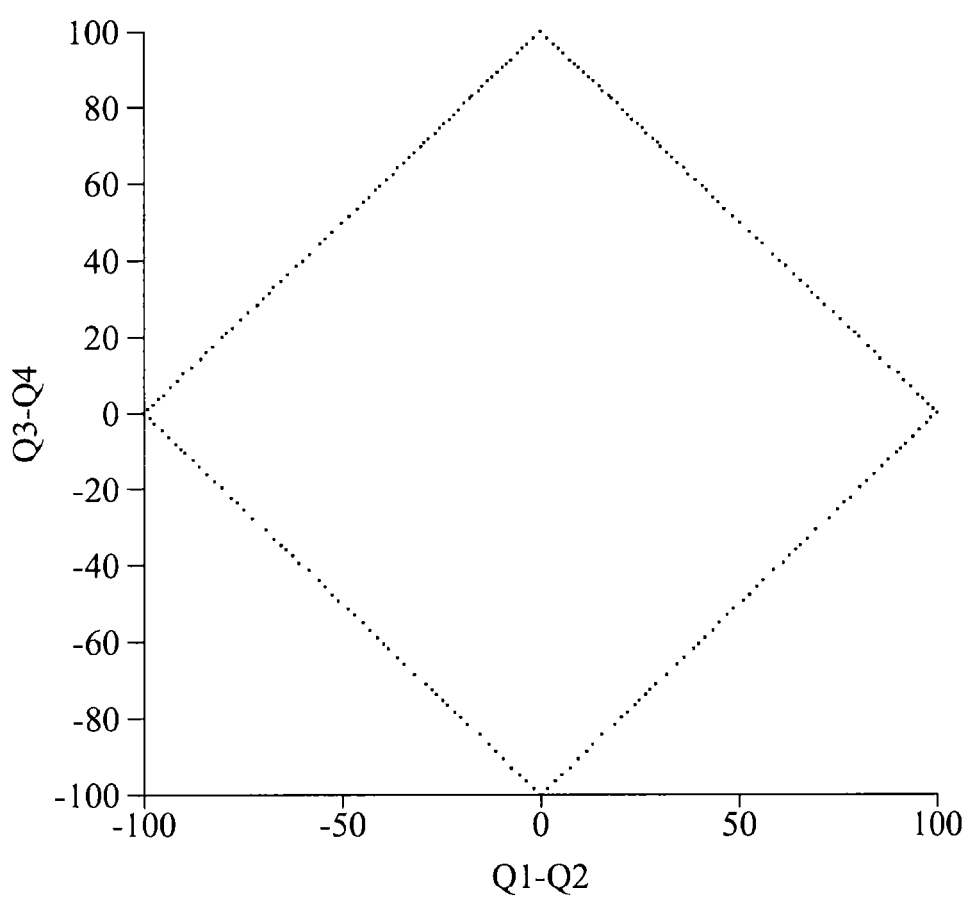
FIG. 7 illustrates regularity between phase information, according to an example embodiment.

FIG. 7 illustrates regularity between phase information relating to the plurality of input depth images, according to an example embodiment.

To generate an input depth image, the camera 110 may measure four pieces of phase information. For example, the phase information may include Q1, Q2, Q3, and Q4.

Q1 may correspond to information about a 0 degree phase ($Q_0$), Q2 may correspond to information about a 180 degree phase ($Q_{180}$), Q3 may correspond to information about a 90 degree phase ($Q_{90}$), and Q4 may correspond to information about a 270 degree phase ($Q_{270}$). For example, Q1 may refer to phase information when a phase difference between the radiated IR light and the reflected IR light is 0 degrees. Q3 may refer to phase information when a phase difference between the radiated IR light and the reflected IR light is 180 degrees. The phase information may refer to an intensity of the reflected IR light. However, the above is exemplary, and thus, the present disclosure is not limited thereto.

According to a measurement principle of phase information, Q1, Q2, Q3, and Q4 may have regularity.

The graph of FIG. 7 may illustrate a relationship between Q1-Q2 and Q3-Q4 in a pixel of a depth image. An x-axis may indicate a result obtained by subtracting a value of Q2 from a value of Q1. A y-axis may indicate a result obtained by subtracting a value of Q4 from a value of Q3. Each of Q1-Q2 and Q3-Q4 may refer to a difference in brightness value between two phase images.

The phase image may correspond to a two-dimensional (2D) image. Accordingly, the difference in brightness value between the phase images may have a 2D value. For example, the 2D value may correspond to each pixel. In addition, each of Q1-Q2 and Q3-Q4 may refer to a brightness value of a pixel in each of the phase images.

Each point of the graph may correspond to a pixel in the input depth image. That is, the pixel in the input depth image may have regularity found in a distribution of points on the graph of FIG. 7. The regularity may be expressed by Equation 4, shown below.

$$k = |Q1 - Q2| + |Q3 - Q4|$$

where k may denote a constant.

That is, for a pixel of an input depth image such as an intermediate input depth image and the like, regularity may indicate that a sum of an absolute value of a difference between Q1 and Q2 and an absolute value of a difference between Q3 and Q4 has a regular value.

It may be assumed that phase information of a predetermined pixel in an intermediate input depth image is measured more accurately as the predetermined pixel is closer to a diamond distribution of points as shown in FIG. 7. That is, it may be assumed that the more distant the predetermined pixel is from the diamond distribution of points, the more inaccurate the measured phase information of the predetermined pixel may be.

The regularity may be maintained when a motion blur is absent in a pixel of an input depth image. That is, a pixel to which the regularity fails to be applied may correspond to a pixel in which a motion blur is present.

Figure 8:
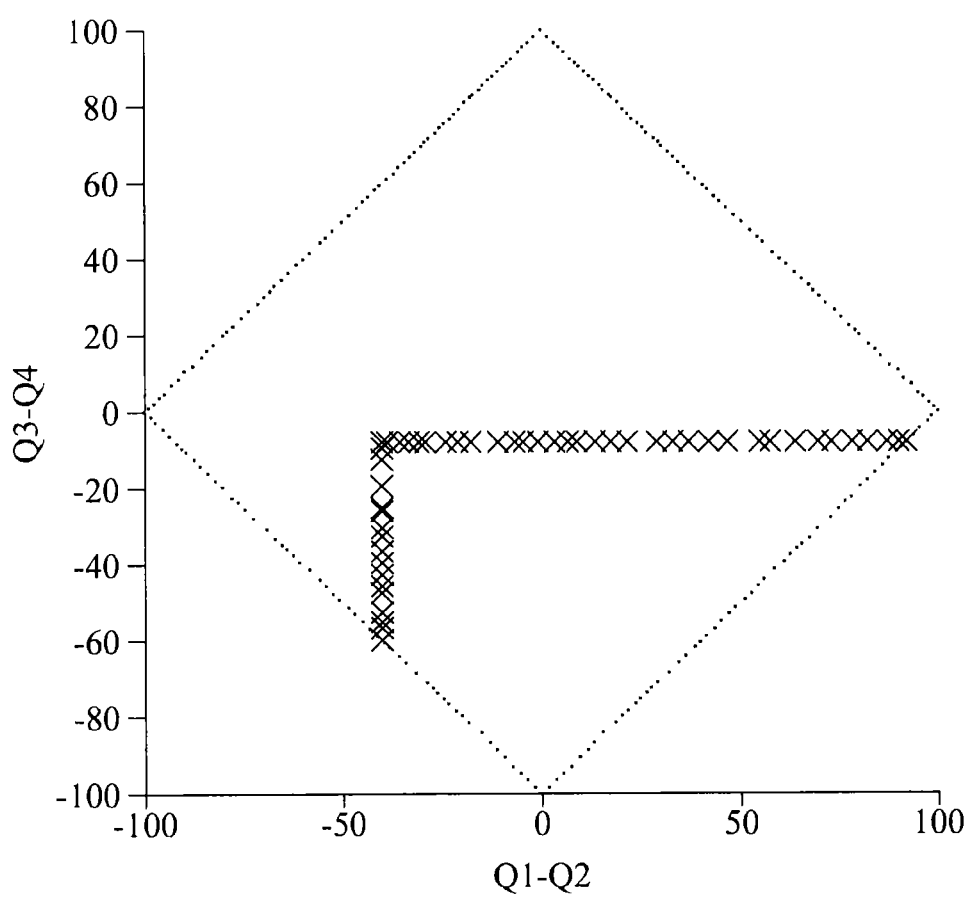
FIG. 8 illustrates a method of determining a motion blur level of a pixel in an input depth image based on phase information, according to an example embodiment.

FIG. 8 illustrates a method of determining a motion blur level in an input depth image based on phase information, according to an example embodiment.

The graph of FIG. 8 may illustrate a relationship between Q1-Q2 and Q3-Q4.

An x-axis may indicate a result obtained by subtracting a value of Q2 from a value of Q1. A y-axis may indicate a result obtained by subtracting a value of Q4 from a value of Q3.

In the graph of FIG. 8, the relationship between Q1-Q2 and Q3-Q4 in a predetermined pixel to which regularity fails to be applied is expressed as a symbol 'x'.

Since the symbol 'x' is distant from a diamond distribution of points, i.e., does not follow the diamond distribution, the processing unit 130 may determine that regularity between phase information is absent in the pixel corresponding to the symbol 'x'. That is, the processing unit 130 may determine that motion blur occurs in the pixel corresponding to the symbol 'x'.

The processing unit 130 may calculate, for a pixel of an input depth image, a sum of an absolute value of a difference between Q1 and Q2 and an absolute value of a difference between Q3 and Q4, and may determine a motion blur level of the pixel based on the calculated sum. The processing unit 130 may determine a higher motion blur level of the pixel as an absolute value of a difference between the calculated sum and the constant k indicating regularity between phase information is greater.

Figure 9:
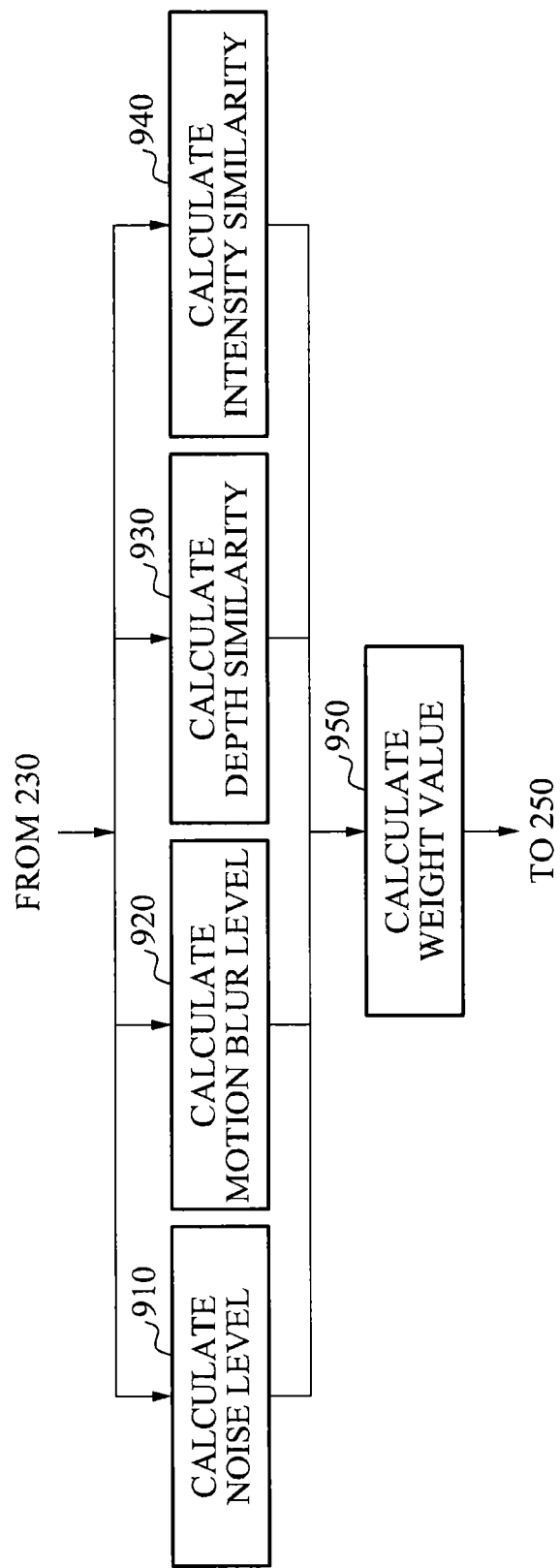
FIG. 9 is a flowchart illustrating a method of calculating a weight value for each spatio-temporal neighboring pixel, according to an example embodiment.

FIG. 9 is a flowchart illustrating a method of calculating a weight value for each spatio-temporal neighboring pixel, according to an example embodiment.

Operation 240 of FIG. 2 may include operations 910, 920, 930, 940, and 950.

In operation 910, the processing unit 130 may calculate a noise level for each of at least one neighboring pixel. A method of calculating the noise level is described in detail with reference to FIG. 5, and thus, repeated descriptions will be omitted for conciseness.

In operation 920, the processing unit 130 may calculate a motion blur level for each of the at least one neighboring pixel. A method of calculating the motion blur level is described in detail with reference to FIGS. 6 through 8, and thus, repeated descriptions will be omitted for conciseness.

In operation 930, the processing unit 130 may calculate a depth similarity between a pixel of an input depth image and at least one spatio-temporal neighboring pixel of the pixel. For example, the depth similarity may be higher as a difference in depth value between the pixel of the input depth image and the at least one spatio-temporal neighboring pixel of the pixel decreases. In other words, as the depths of each of the pixel and the at least one spatio-temporal neighboring pixel become more similar, the depth similarity increases. That is, the depth similarity may be inversely proportional to an absolute value of the difference in depth value between the pixel of the input depth image and the at least one spatio-temporal neighboring pixel of the pixel.

In operation 940, the processing unit 130 may calculate an intensity similarity between a pixel of an IR intensity image and at least one spatio-temporal neighboring pixel of the pixel. For example, the intensity similarity may be higher as a difference in intensity values between the pixel of the IR intensity image and the at least one spatio-temporal neighboring pixel of the pixel decreases. That is, the intensity similarity may be inversely proportional to an absolute value of the difference in intensity values between the pixel of the IR intensity image and the at least one spatio-temporal neighboring pixel of the pixel.

The input depth image in operation 930 and the IR intensity image in operation 940 may refer to corresponding images. In addition, the pixel of the input depth image in operation 930 and the pixel of the IR intensity image in operation 940 may refer to corresponding pixels. The corresponding pixels may represent different information of the same pixel.

A pixel may correspond to the pixel of the input depth image such as, for example, an intermediate input depth image, or the pixel of the IR intensity image. A pixel 'j' may correspond to one neighboring pixel among the at least one spatio-temporal neighboring pixel of the pixel 'i'.

In operation 950, the processing unit 130 may calculate a weight value of the neighboring pixel based on at least one of the noise level of the neighboring pixel, the motion blur level of the neighboring pixel, the depth similarity between the pixel of the input depth image and the neighboring pixel, and the intensity similarity between the pixel of the IR intensity image and the neighboring pixel. However, the above is exemplary, and thus, the present disclosure is not limited thereto.

Depending on embodiments, the processing unit 130 may increase the weight value for each of the at least one neighboring pixel as the noise level for each of the at least one neighboring pixel decreases. The processing unit 130 may also increase the weight value for each of the at least one neighboring pixel as the motion blur level for each of the at least one neighboring pixel decreases. The processing unit 130 may also increase the weight value for each of the at least one neighboring pixel as the depth similarity between each of the at least one neighboring pixel and the pixel of the input depth image decreases. The processing unit 130 may increase the weight value for each of the at least one neighboring pixel as the intensity similarity between each of the at least one neighboring pixel and the pixel of the IR intensity image decreases. However, the above is exemplary, and thus, the present disclosure is not limited thereto.

For example, the processing unit 130 may calculate the weight value based on Equation 5.

$$W_1(k, i, m, j) = \frac{1}{\sqrt{2\pi\sigma^2}} \exp\left(-\frac{(C_1 E_N + C_2 E_M + C_3 E_{S1} + C_4 E_{S2})}{2\sigma^2}\right) \quad \text{[Equation 5]}$$

where 'i' may denote a pixel of an input depth image and a pixel of an IR intensity image corresponding to the pixel of the input depth image. 'j' may denote one neighboring pixel among at least one neighboring pixel of the pixel 'i'. 'k' may denote a kth input depth image among N input depth images. The kth input depth image may correspond to the input depth image of the pixel 'i'. That is, 'k' may denote an index of the input depth image including the pixel 'i'.

$W_1(k, i, m, j)$ may correspond to a weight value of a spatio-temporal neighboring pixel 'j' of the pixel 'i' in an mth input depth image, used to filter out the pixel 'i' of the kth input depth image. For example, the kth input depth image may correspond to an intermediate input depth image. The mth input depth image may correspond to one input depth image among a previous input depth image, an intermediate input depth image, and a next input depth image.

'$\sigma$' may denote a constant of a Gaussian distribution.

$E_N$ may denote a value of energy of noise in the pixel 'j'. $E_N$ may correspond to $E_{N1}$ of the foregoing Equation 1. $E_N$ may correspond to $E_{N2}$ of the foregoing Equation 2. The processing unit 130 may calculate $E_N$ based on at least one of $E_{N1}$ and $E_{N2}$.

$E_M$ may denote an energy value for a motion blur in the pixel 'j'. $E_M$ may correspond to $E_{MB}$ of the foregoing Equation 3. The processing unit 130 may calculate $E_M$ based on $E_{MB}$.

$E_{S1}$ may denote an energy value for the depth similarity blur between the pixel and the pixel 'j'.

$E_{S2}$ may denote an energy value for the intensity similarity between the pixel 'i' and the pixel 'j'.

$C_1$, $C_2$, $C_3$, and $C_3$ may denote weight values of $E_N$, $E_M$, $E_{S1}$, and $E_{S2}$, respectively, and may have a value of 0 or more.

After the weight value of the at least one neighboring pixel for each pixel of the input depth image is calculated, the processing unit 130 may generate an output depth image in operation 250.

A depth value for each pixel of the output depth image may correspond to a sum of the product of a weight value and a depth value of at least one neighboring pixel of a pixel of the output depth image. That is, the processing unit 130 may determine the sum of a product of the weight value and the depth value of the at least one neighboring pixel of the pixel of the input depth image, to be a depth value of a pixel of the output depth image corresponding to the pixel of the input depth image.

The processing unit 130 may calculate a depth value for each pixel of the output depth image based on Equation 6, shown below.

$$D_{filtered}(k, i) = \sum_{(m,j) \in N(k,i)} W_1(k, i, m, j) \cdot D_{raw}(m, j) \quad \text{[Equation 6]}$$

where $D_{raw}(m, j)$ may denote a depth value of a pixel 'j' of an mth input depth image.

$N(k, j)$ may denote a set of at least one neighboring pixel of a pixel 'j' of a kth input depth image.

$D_{filtered}(k, i)$ may denote a depth value of a pixel of a kth output depth image. The kth output depth image may refer to an output depth image corresponding to the kth input depth image.

The output depth image may correspond to a depth image filtered by a weight value and a depth value of at least one neighboring pixel. Accordingly, the output depth image may be referred to as a filtered depth image.

Figure 10:
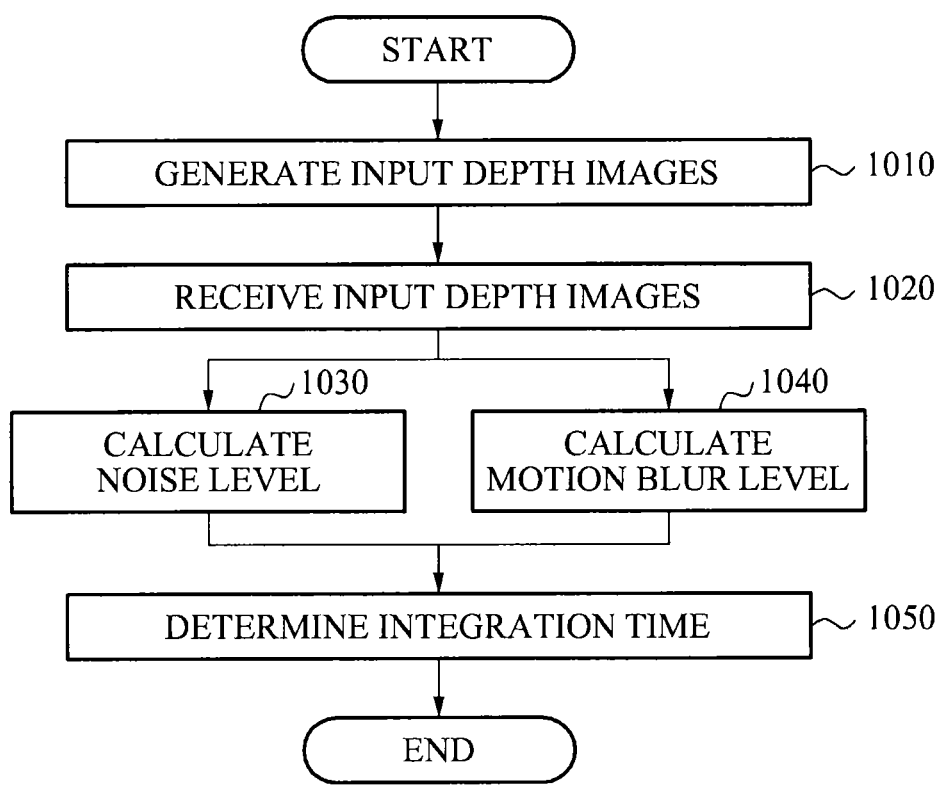
FIG. 10 is a flowchart illustrating a method of processing a depth image that adjusts an integration time of a depth image, according to an example embodiment.

FIG. 10 is a flowchart illustrating a method of processing a depth image that adjusts an integration time of a depth image according to an example embodiment.

In operation 1010, the camera 110 may generate a plurality of input depth images by photographing a scene. The camera 110 may generate the plurality of input depth images by photographing the scene progressively.

Integration times of the plurality of input depth images may be different. That is, the camera 110 may take the plurality of input depth images during different integration times.

In operation 1020, the receiving unit 120 may receive the plurality of input depth images from the camera 110.

In operation 1030, the processing unit 130 may calculate a noise level of the received input depth image. The input depth image may correspond to a current input depth image among the plurality of input depth images. A method of calculating the noise level is described in detail with reference to at least FIG. 5, and thus, repeated descriptions will be omitted for conciseness. For example, the noise level of the input depth image may correspond to a noise level for each pixel of the input depth image or an average noise level of pixels of the input depth image.

In operation 1040, the processing unit 130 may calculate a motion blur level of the input depth image. A method of calculating the motion blur is described in detail with reference to at least FIGS. 6 through 8. For example, the motion blur level of the input depth image may correspond to a motion blur level for each pixel of the input depth image or an average motion blur level of pixels of the input depth image.

Accordingly, the processing unit 130 may calculate at least one of the noise level and the motion blur level by performing at least one of the operations 1030 and 1040. That is, operation 1030 may be performed, operation 1040 may be performed, or both operations 1030 and 1040 may be performed.

In operation 1050, the processing unit 130 may determine an integration time used to generate the depth image based on at least one of the calculated noise level and the calculated motion blur level.

The processing unit 130 may determine the integration time used to generate the depth image based on Equation 7, shown below.

$$T(k+1) = T(k) + \alpha \Delta T(k), \quad \text{[Equation 7]}$$
$$\Delta T(k) = \sum_{i,j} W_2(k, i, j) - \sum_{i,j} W_2(k-1, i, j),$$
$$W_2(k, i, j) = \frac{1}{\sqrt{2\pi\sigma^2}} \exp\left(-\frac{(C_5 E_N - C_6 E_M)}{2\sigma^2}\right)$$

$T(k)$ may denote an integration time of a kth input depth image. $T(k+1)$ may denote an integration time of a k+1th input depth image, that is, an input depth image to be taken next. $\Delta$ may denote a variation of integration time determined based on at least one of a noise level and a motion blur level of the kth input depth image. $\alpha$ may denote a constant value for adjusting the variation of integration time.

'k', 'i', 'j', 'σ', $E_N$, and $E_M$ may correspond to those of Equation 6. $C_5$ and $C_6$ may denote weight values of $E_N$ and $E_M$, respectively, and may have a value of 0 or greater.

Depending on embodiments, the processing unit 130 may increase the integration time when the noise level of the input depth image is greater than a noise level of a previous depth image. The processing unit 130 may decrease the integration time when the motion blur level of the input depth image is greater than a motion blur level of a previous depth image. The increased or decreased integration time may be used to generate a next depth image. That is, when an amount of noise in input depth images generated by the camera 110 increases over time, the processing unit 130 may increase the integration time used to generate the input depth image, thereby improving the quality of the outputted depth image. In addition, when motion blur in input depth images generated by the camera 110 increases over time, the processing unit 130 may decrease the integration time used to generate the input depth image, thereby improving the quality of the outputted depth image.

When the integration time is excessively short, an amount of noise may increase, compared to distance information of the input depth image. When the amount of noise increases, a quality of the input depth image may be degraded. That is, measuring a depth of an object located at a relatively longer distance on which a relatively insufficient amount of light falls may be more difficult than measuring a depth of an object located at a relatively shorter distance from the camera 110, for example. The adjustment of the integration time may minimize noise and motion blur that may occur in the input depth image.

For example, the technical disclosure described with reference to FIGS. 1 through 9 may be applied in order to minimize noise and motion blur. The operations 1010, 1020, 1030, and 1040 may correspond to the operations 210, 220, 910, and 920, respectively, and thus further detailed description is omitted herein for conciseness and ease of description.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The methods according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard discs, floppy discs, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), a USB memory, and a CD-R (Recordable)/RW.

Further, according to an aspect of the embodiments, any combinations of the described features, functions and/or operations can be provided.

Moreover, the apparatus for processing a depth image may include at least one processor to execute at least one of the above-described units and methods.

Although embodiments of the present invention have been shown and described, it would be appreciated by those skilled in the art that changes may be made in these embodiments without departing from the principles and spirit of the disclosure, the scope of which is defined by the claims and their equivalents.

What is claimed is:

1. A method of processing a depth image, the method comprising:
   determining at least one spatio-temporal neighboring pixel of a pixel of an input depth image based on a previous input depth image, an intermediate input depth image that corresponds to the input depth image, and a next input depth image, the previous input depth image corresponding to an input depth image preceding the intermediate input depth image in time, the next input depth image corresponding to an input depth image following the intermediate input depth image in time;
   calculating a weight value of the at least one spatia-temporal neighboring pixel using a calculated noise level, a calculated motion blur level, a calculated depth similarity, and a calculated intensity similarity; and
   generating an output depth image by updating a depth value of the pixel of the input depth image based on a depth value and the calculated weight value of the at least one spatio-temporal neighboring pixel.

2. The method of claim 1, wherein the determining comprises:
   identifying a first correspondence between the previous input depth image and the next input depth image;
   detecting a motion vector based on the identified first correspondence;
   estimating a second correspondence between the intermediate input depth image and one of the previous and next input depth images based on the detected motion vector; and
   determining at least one spatio-temporal neighboring pixel of a pixel of the intermediate input depth image based on the estimated second correspondence.

3. The method of claim 2, wherein an integration time of the previous input depth image and an integration time of the next input depth image are shorter than an integration time of the intermediate input depth image.

4. The method of claim 2, wherein the identifying comprises:
   calculating an optical flow between a previous infrared (IR) intensity image and a next IR intensity image; and
   identifying the first correspondence based on the optical flow,
   wherein the previous IR intensity image corresponds to the previous input depth image, and the next IR intensity image corresponds to the next input depth image.

5. The method of claim 4, wherein the identifying further comprises:
   reducing an amount of noise in the previous IR intensity image and the next previous IR intensity image by applying a bilateral filter to the previous IR intensity image and the next previous IR intensity image.

6. The method of claim 1, wherein the weight value of the at least one neighboring pixel increases as the amount of noise decreases in the at least one neighboring pixel.

7. The method of claim 1, wherein the weight value of the at least one neighboring pixel increases as motion blur occurring in the at least one neighboring pixel decreases.

8. The method of claim 1, wherein a motion blur is present when a pixel to which regularity fails to be applied exists.

9. A non-transitory computer-readable recording medium comprising a program for implementing the method of claim 1.

10. An apparatus for processing a depth image, the apparatus comprising:
a receiver configured to receive an input depth image; and
a processor configured to,
determine at least one spatio-temporal neighboring pixel of a pixel of the input depth image based on a previous input depth image, an intermediate input depth image that corresponds to the input depth image, and a next input depth image, the previous input depth image corresponding to an input depth image preceding the intermediate input depth image in time, the next input depth image corresponding to an input depth image following the intermediate input depth image in time,
calculate a weight value of the at least one spatio-temporal neighboring pixel using a calculated noise level, a calculated motion blur level, a calculated depth similarity, and a calculated intensity similarity, and
generate an output depth image by updating a depth value of the pixel of the input depth image based on a depth value and the calculated weight value of the at least one spatio-temporal neighboring pixel.

11. The apparatus of claim 10, wherein the input depth image corresponds to an intermediate input depth image, and the processor is configured to,
identify a first correspondence between the previous input depth image and the next input depth image,
to detect a motion vector based on the identified first correspondence, to estimate a second correspondence between the intermediate input depth image and one of the previous and next input depth images based on the detected motion vector, and
to determine at least one spatio-temporal neighboring pixel of a pixel of the intermediate input depth image based on the estimated second correspondence.

12. The apparatus of claim 11, wherein an integration time of the previous input depth image and an integration time of the next input depth image are shorter than an integration time of the intermediate input depth image.

13. The apparatus of claim 11, wherein the processor is configured to,
calculate an optical flow between a previous infrared (IR) intensity image and a next IR intensity image, and
identify the first correspondence based on the optical flow,
wherein the previous IR intensity image corresponds to the previous input depth image, and the next IR intensity image corresponds to the next input depth image.

14. The apparatus of claim 13, wherein the processor is configured to reduce an amount of noise in the previous IR intensity image and the next previous IR intensity image by applying a bilateral filter to the previous IR intensity image and the next previous IR intensity image.

15. The apparatus of claim 10, wherein the processor is configured to increase the weight value of the at least one neighboring pixel as the amount of noise decreases in the at least one spatio-temporal neighboring pixel.

16. The apparatus of claim 10, wherein the processor is configured to increase the weight value of the at least one neighboring pixel as motion blur occurring in the at least one spatio-temporal neighboring pixel decreases.

* * * * *